(12) United States Patent
Murthy et al.

(10) Patent No.: US 10,660,030 B2
(45) Date of Patent: May 19, 2020

(54) SYSTEM AND METHOD FOR CONTROLLING USES OF WIRELESS POINTS OF ACCESS DURING TESTING OF RADIO FREQUENCY (RF) DEVICES UNDER TEST (DUTS)

(71) Applicant: LitePoint Corporation, Sunnyvale, CA (US)

(72) Inventors: Prashanth Murthy, Arlington Heights, IL (US); Steven L. Sheya, Libertyville, IL (US)

(73) Assignee: LITEPOINT CORPORATION, San Jose, CA (US)

( * ) Notice: Subject to any disclaimer, the term of this patent is extended or adjusted under 35 U.S.C. 154(b) by 65 days.

(21) Appl. No.: 15/891,876

(22) Filed: Feb. 8, 2018

(65) Prior Publication Data

US 2019/0246345 A1   Aug. 8, 2019

(51) Int. Cl.
| | |
|---|---|
| *H04W 48/00* | (2009.01) |
| *H04W 8/22* | (2009.01) |
| *H04W 88/02* | (2009.01) |
| *H04W 84/12* | (2009.01) |

(52) U.S. Cl.
CPC ............ *H04W 48/17* (2013.01); *H04W 8/22* (2013.01); *H04W 84/12* (2013.01); *H04W 88/02* (2013.01)

(58) Field of Classification Search
CPC ....... H04W 48/17; H04W 8/22; H04W 84/12; H04W 88/02
USPC .......................................... 370/310, 328, 329
See application file for complete search history.

(56) References Cited

U.S. PATENT DOCUMENTS

| | | | | |
|---|---|---|---|---|
| 2009/0094680 A1* | 4/2009 | Gupta | ................... | H04L 63/104 726/3 |
| 2009/0290493 A1* | 11/2009 | Xu | ......................... | H04W 28/08 370/237 |
| 2013/0283358 A1* | 10/2013 | Manroa | ................. | H04W 12/08 726/5 |

* cited by examiner

*Primary Examiner* — Obaidul Huq
(74) *Attorney, Agent, or Firm* — Rosenbaum IP, P.C.

(57) ABSTRACT

A system and method for controlling uses of respective tester points of access (PoAs) during wireless testing of one or more radio frequency (RF) signal transceiver devices under test (DUTs) in which one or more device identifiers are used to determine whether a DUT requesting access to one of multiple wireless PoAs is eligible to interact with the PoA receiving such request or, instead, eligible to interact with another one of the multiple PoAs and is to be redirected to such other PoA. Access by the requesting DUTs to respective PoAs may be predetermined so as to control loading of the PoAs during testing.

13 Claims, 3 Drawing Sheets

PRIOR ART

SYSTEM AND METHOD FOR CONTROLLING USES OF WIRELESS POINTS OF ACCESS DURING TESTING OF RADIO FREQUENCY (RF) DEVICES UNDER TEST (DUTS)

BACKGROUND

The present invention relates to testing of wireless RF devices under test (DUTs), and in particular, to controlling uses of multiple wireless points of access in a testing environment to manage loading by the DUTs during testing.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include, at least, one or more sources of test signals (e.g., in the form of a vector signal generator, or "VSG") for providing the source signals to be transmitted to the DUT, and one or more receivers (e.g., in the form of a vector signal analyzer, or "VSA") for analyzing signals produced by the DUT. Together, the VSG and VSA (as well as any internal or otherwise associated control software and/or firmware) establish one or more points of access (PoA) since they provide, to the DUT, access to the signal generating and analyzing resources of the VSG and VSA, respectively, via the applicable signal frequencies, communication channels, data packet structures, signal modulation types, etc., in accordance with the type of DUT being tested. (As is well known, a PoA may be more specifically referred to by different names depending upon the type of wireless system. For example, while in a Wi-Fi system it is generally referred to as a channel, in a mobile telephone system, such as cellular, the wireless point of access may more generally be referred to as a "cell". For purposes of the present discussion, a PoA is a subsystem for enabling wireless signal connections and/or communications between a DUT and a tester.) The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Referring to FIG. 1, a typical testing environment 10a includes a tester 12 and a DUT 16, with test data packet signals 21t and DUT data packet signals 21d exchanged as RF signals conveyed between the tester 12 and DUT 16 via a conductive signal path 20a, typically in the form of co-axial RF cable 20c and RF signal connectors 20tc, 20dc. As noted above, the tester typically includes a signal source 14g (e.g., a VSG) and a signal analyzer 14a (e.g., a VSA). The tester 12 and DUT 16 may also include preloaded information regarding predetermined test sequences, typically embodied in firmware 14f within the tester 12 and firmware 18f within the DUT 16. The testing details within this firmware 14f, 18f about the predetermined test flows typically require some form of explicit synchronization between the tester 12 and DUT 16, typically via the data packet signals 21t, 21d. Alternatively, testing may be controlled by a controller 30 which may be integral to the tester 12 or external (e.g., a programmed personal computer) as depicted here. The controller 30 may communicate with the DUT 16 via one or more signal paths (e.g., Ethernet cabling, etc.) 31d to convey commands and data. If external to the tester 12, the controller 30 may further communicate with the tester 12 via one or more additional signal paths (e.g., Ethernet cabling, etc.) 31t to convey additional commands and data.

Ordinarily when testing a wireless device (e.g., mobile telephony (such a cellular telephone handsets), wireless fidelity (Wi-Fi), Bluetooth, Zigbee, Z-Wave, or similar devices) with a tester, once communications between tester and DUT have been established, the tester and DUT will execute a test flow during which the tester or controller may control the behavior of the DUT (e.g., by executing control commands via driver software associated with the DUT). Commands may include instructing the DUT to receive test packets from the tester, or to transmit packets to the tester. The characteristics of the packets may also be controlled, such as signal frequency(ies), power level, data rate, modulation, etc.

Referring to FIG. 2, an alternative testing environment 10b uses a wireless signal path 20b via which the test data packet signals 21t and DUT data packet signals 21d may be communicated via respective antenna systems 20ta, 20da of the tester 12 and DUT 16. This type of test environment is often referred to as an over-the-air (OTA) test environment. Generally, at least for final production testing, an OTA test environment is preferred so that the DUT may be tested in its complete and final form so that not only the internal circuit subsystems are exercised but the antenna subsystem(s) of the DUT are exercised as well so that signal effects due to all DUT subsystems can be monitored and measured.

Test instrumentation in an OTA test environment is capable of handling multiple DUTs (e.g., 32 DUTs with 8 DUTs per point of access (PoA)). A DUT may enter the system at random and connect to any active PoA since in such OTA test environments with multiple tester points of access (i.e., transceiver subsystems) the user/tester does not have deterministic control of how or where a DUT autonomously connects to the test system(s). For example, when a test system(s) is broadcasting via multiple PoAs on different frequencies, a DUT may autonomously attach on any of these PoAs. When multiple DUTs connect randomly to different PoAs, test system resources are not assigned in an ideal manner. Conventionally, an external application has been required to detect the random resource assignments and then individually determine appropriate assignments and re-assign certain DUTs to one or more other PoAs. Such re-assignments require use of special redirection or handover procedures to establish a steady state loading of DUTs to PoAs before starting the tests. For example, such handover procedures in cellular telephony must support direction to and/or from LTE FDD/TDD and WCDMA, which requires an intelligent external test application for controlling the system to execute the relevant redirection or handover procedures. Hence, it would be desirable to be able to deterministically assign system resources and configurations of the test system, such as the PoAs, to each DUT without any action on the part of the DUT required or need for an external test application.

SUMMARY

A system and method for controlling uses of respective tester points of access (PoAs) during wireless testing of one or more radio frequency (RF) signal transceiver devices under test (DUTs) are provided in which one or more device identifiers are used to determine whether a DUT requesting access to one of multiple wireless PoAs is eligible to interact with the PoA receiving such request or, instead, eligible to interact with another one of the multiple PoAs and is to be redirected to such other PoA. Access by the requesting DUTs to respective PoAs may be predetermined so as to control loading of the PoAs during testing.

In accordance with exemplary embodiments, a method for controlling uses of respective tester points of access during wireless testing of one or more radio frequency (RF) signal transceiver devices under test (DUTs) includes: receiving, via a first wireless point of access (PoA) of a plurality of PoAs, a request by a DUT for access, wherein the request includes a unique device identifier associated with the DUT; determining, based on the unique device identifier included in the request, an eligibility of the DUT for access via the first PoA; responsive to a determination of eligibility of the DUT for access via the first PoA, enabling access by the DUT via the first PoA; responsive to a determination of eligibility of the DUT for access via a second PoA of the plurality of PoAs, transmitting a redirection message for the DUT with an identifier for the second PoA; receiving, via the second wireless access point, another request by the DUT for access via the second PoA, wherein the other request includes the unique device identifier; and enabling access by the DUT via the second PoA.

In accordance with further exemplary embodiments, such method includes determining, based on the unique device identifier included in the requests, an eligibility of said DUT for access via the PoAs by comparing the unique device identifier with one or more predetermined device identifiers.

DETAILED DESCRIPTION

Figure 1:
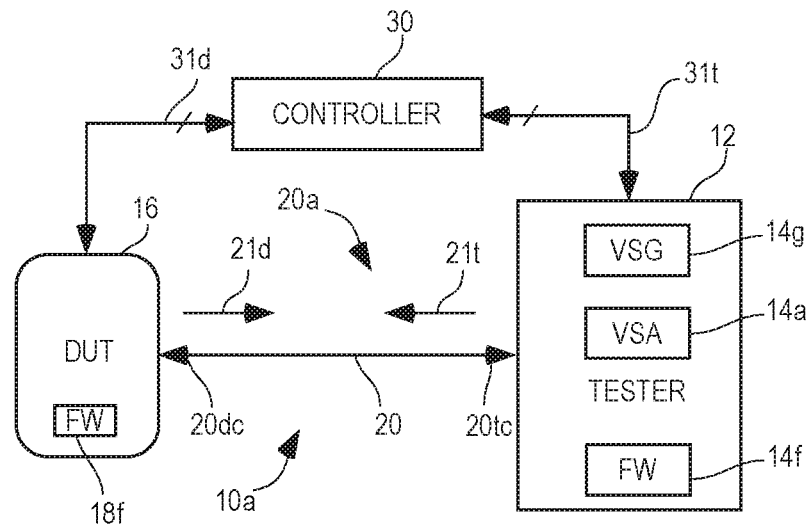
FIG. 1 depicts a typical testing environment for a radio frequency (RF) data packet signal transceiver device under test (DUT) in a conductive, or wired, environment.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, a data signal or a protocol data unit. Within the drawings, like or related elements will have like or related alpha, numeric or alpha-numeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac ("Wi-Fi"), 3GPP LTE, 4G, 5G, Bluetooth, Zigbee, Z-Wave, etc. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and one or more transmitters. Thus, the tests are intended to confirm whether the receivers and transmitters both conform. Tests of the receiver(s) of the DUT (RX tests) typically involve a test system (tester) sending test packets to the receiver(s) and some way of determining how the DUT receiver(s) respond to those test packets. Tests of the transmitter(s) of the DUT (TX tests) are performed by having them send packets to the test system, which may then evaluate various physical characteristics of the signals from the DUT. Hence, while the following discussion is more particularly focused on testing mobile telephony devices, such as cellphones, it will be appreciated that the principles discussed are applicable to other wireless technologies (such as those mentioned above) as well.

As discussed in more detail below, a method is provided for enabling automatic redirection of the DUT (e.g., a mobile telephone handset, or UE) to a predetermined PoA, thereby autonomously distributing the test load and resources among the test instrumentation without special DUT interaction or need for an external application to perform these tasks. Advantageously, such method uses redirection procedures specified in the standards in a novel way to achieve resource distribution across different PoAs or test instruments.

More particularly, while operating in an OTA test environment (i.e., with no RF isolation among the PoAs), such method enables distribution of DUTs among different PoAs contained within the same tester and/or among different PoAs contained within/among multiple testers. Such method also eliminates any need to configure the respective DUTs differently so as to direct it to a specific tester PoA by providing for predetermined designations of resource allocations among the tester(s) in a programmable database containing DUT-specific information.

Figure 2:
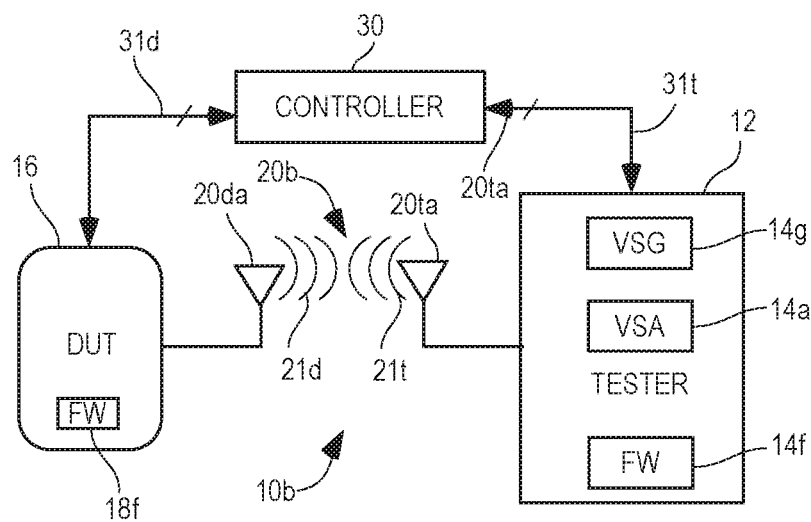
FIG. 2 depicts a typical testing environment for a DUT in a radiative, or wireless, environment.
Figure 3:
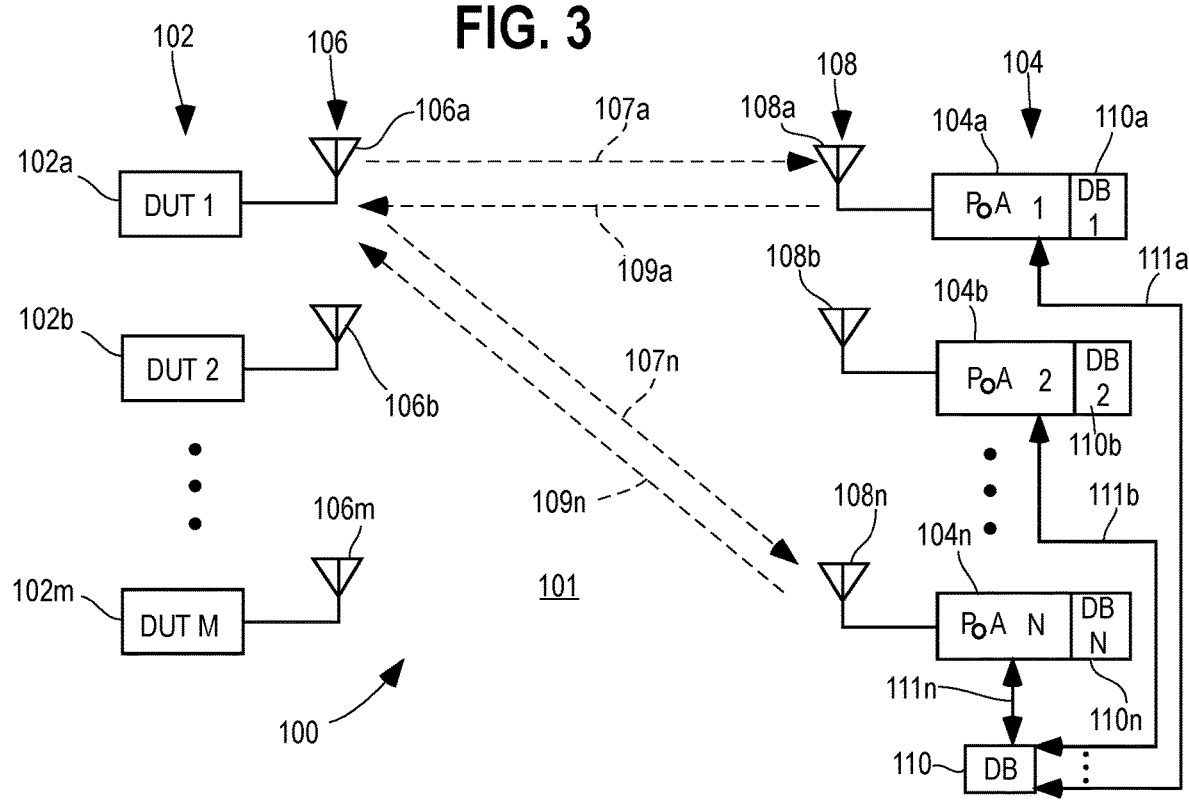
FIG. 3 depicts an exemplary embodiment of a wireless testing environment for multiple DUTs having controlled access to wireless points of access (PoA).

Referring to FIG. 3, a wireless testing environment 100 in accordance with exemplary embodiments, may include multiple PoAs 104 (104a, 104b, . . . , 104n), e.g., as established by the VSG 14g, VSA 14a and firmware 14f of the hosting tester(s) 12 (FIGS. 1-2). While the PoAs 104 are depicted as individual PoAs 104a, 104b, . . . , 104n, it will be readily appreciated that various ones of the PoAs 104a, 104b, . . . , 104n may be established together in a single tester 12, or individually with each established in its own tester 12, or in identical or variably sized groups of one or more PoAs 104a, 104b, . . . , 104n in a corresponding number of respective testers 12 (discussed in more detail below), or otherwise associated with or controlled by one or more testers 12 or controllers 30 (FIG. 2). These PoAs 104 may be used to test multiple DUTs 102 (102a, 102b, . . . , 102m) in an OTA environment 101, as prescribed herein. In accordance with well-known principles, the DUTs 102 and PoAs 104 communicate with each other using wireless signals 107 via their respective antennas 106, 108. (While each antenna 106a, 106b, . . . , 106m, 108a, 108b, . . . , 108n here is depicted as a single antenna, it will be appreciated that, as is common in the industry, both the DUTs 102 and the PoAs 104 may, in practice, each use multiple antennas in various forms of antenna arrays.) As discussed in more detail below, the wireless signals 107 include request signals 107a, . . . 107n from the DUTs 102 requesting access, or attachment, to the PoAs 104, and response signals 109a, . . . 109n from the PoAs 104 for redirecting a requesting DUT 102 to another PoA 104 or accepting the request for access.

As noted above, the M DUTs 102 seeking to connect to the N PoAs 104 of the system 100 do so at random. In accordance with exemplary embodiments, based upon a priori criteria (e.g., known features and/or characteristics sought to be tested in the DUTs 102, and/or capabilities of and/or desired loading levels of respective PoAs 104), each DUT 102 is assigned for interaction with (e.g., access to) a target PoA 104, with such assignment also including other system parameters as desired (e.g., signal frequencies and/or channels, data packet structures, bit rates, modulation types, etc.). Such parameters for each DUT will be used for any PoA to which it is assigned.

For example, when a first DUT 102a seeks to connect to the system, it may send a request for access, or attachment, to the first PoA 104a. In response to this request 107a, an assigned or otherwise associated database (DB) 110a is checked to determine whether the requesting DUT 102a is assigned to the first PoA 104a. If it is, a response signal 109a is sent via the PoA 104a for the requesting DUT 102a granting the request. If not, e.g., it is determined that the requesting DUT 102a is assigned to the last PoA 104n, a response signal 109a is sent via the currently requested PoA 104a for the requesting DUT 102a redirecting it to the assigned PoA 104n. This latter response signal 109a may include identification information for the assigned PoA 104n to enable the requesting DUT 102 to directly and immediately send anther request signal 107n to attach to its assigned PoA 104n. In response to this second request 107n, another assigned or otherwise associated database 110n is checked to determine whether the requesting DUT 102a is assigned to the last PoA 104n. Following confirmation of the assignment, a response signal 109n is sent via the PoA 104n for the requesting DUT 102a granting the request.

Alternatively, the prior PoA response signal 109a may also include some form of pre-approval information (e.g., a token in some form) so that, upon receipt of the second request 107n from the DUT 102a, it's the response signal 109n may be returned via assigned PoA 104n for granting access without need for referring to its database 110n.

As depicted here, each PoA 104a, 104b, . . . , 104n may have its own assigned or otherwise associated DUT assignment database 110a, 110b, 110n. Alternatively, one or more shared databases 110 may be used and made accessible, e.g., via dedicated or network addressable data paths 111a, 111b, . . . , 111n for use by the VSG 14g, VSA 14a and firmware 14f of the hosting tester(s) 12 for validating access requests from DUTs.

Figure 4:
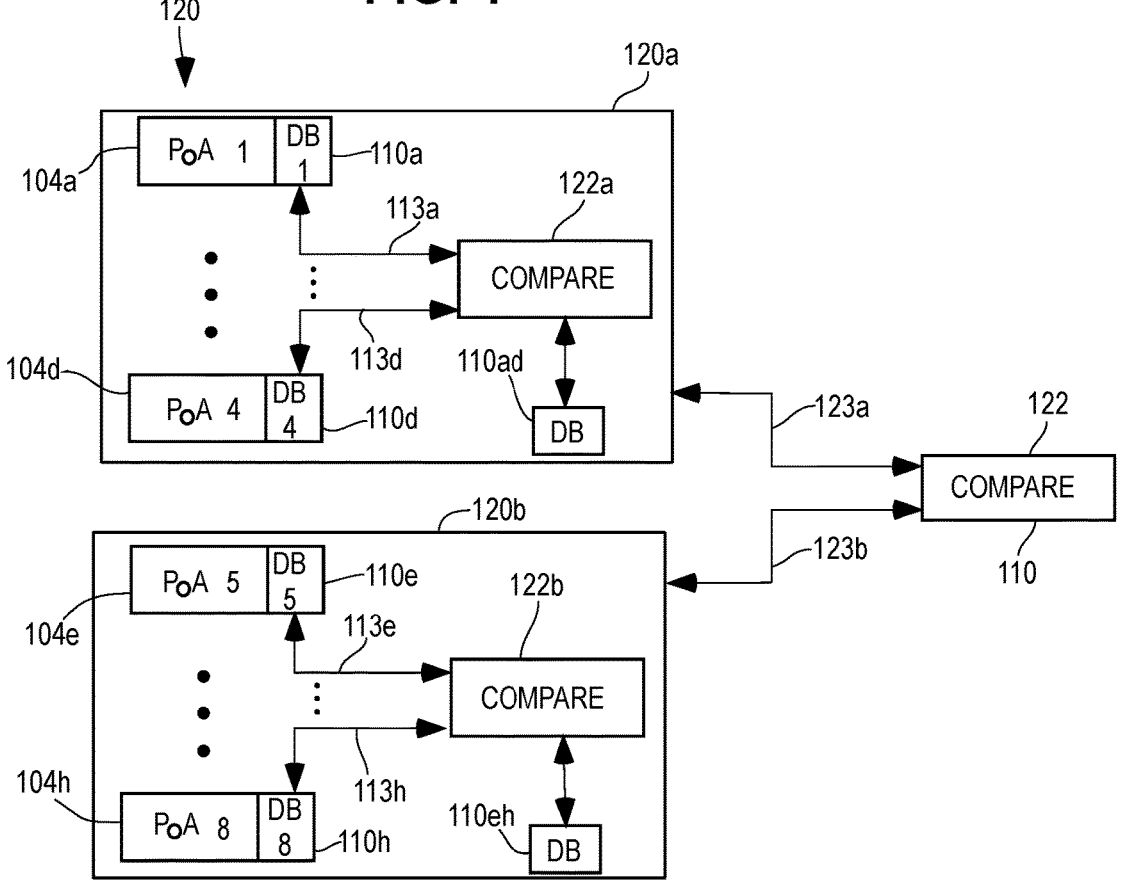
FIG. 4 depicts an exemplary embodiment of a wireless testing environment for multiple DUTs having controlled access to PoAs housed in multiple testers.

Referring to FIG. 4, for example, multiple testers 120 (e.g., two testers 120a, 120b as depicted here, although it will be readily appreciated that the number of testers hosting PoAs may vary as needed) may be used to host subsets of PoAs 104a, . . . , 104d, 104e, . . . , 104h having their own respective assigned or otherwise associated DUT assignment database 110a, . . . , 110d, 110e, . . . , 110h for access via data connections 113a, 113b by a comparison capability 122a, 122b of the tester 120a, 120b for comparing unique device identifiers received from the DUTs 102 with the predetermined identifiers. Alternatively, one or more of the multiple testers 120 may have a shared internal or otherwise associated DUT assignment database 110od, 110eh for use by the comparison capability 122a, 122b. Further alternatively, the PoAs 104a, . . . , 104d, 104e, . . . , 104h and/or multiple testers 120 may share, via shared data connections 123a, 123b, a remote comparison capability 122 for comparing unique device identifiers received from the DUTs 102 with predetermined identifiers in an associated shared database 110. (As will be readily appreciated, such data comparison capability may be implemented in hardware or software or combinations of hardware and software in accordance with well-known principles. As will be further appreciated, any or all of the 110a, . . . , 110d, 110e, . . . , 110h, 110, 110od, 110eh may be programmable to be modified by a user of the tester(s) as desired.)

Figure 5:
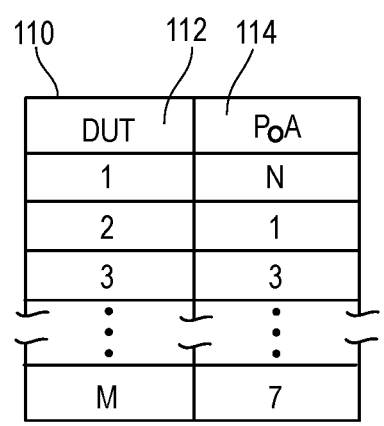
FIG. 5 depicts an exemplary database containing predetermined assignments of DUTs to PoAs in the wireless testing environments of FIGS. 4-5.

Referring to FIG. 5, a database 110 in accordance with exemplary embodiments for the predetermined DUT-PoA assignments can be visualized as a table in which DUT identities 112 are listed along with their assigned PoAs 114. In accordance with well-known principles and practices, it will be appreciated that such a database can be embodied as electronic data stored in electronic memory, e.g., configured as a lookup table (LUT).

It will also be appreciated that while the DUTs have been identified in a simple numerical order, such numerical identities 1-M in actual practice may be in the form of identification used in accordance with the radio access technology (RAT) currently in use for communications between the DUTs 102 and cells 104 for a test. As is well known, a RAT is a physical connection method for a RF communication network. Modern mobile (e.g., cellular) telephones support multiple RATs within a single device such as Bluetooth, Wi-Fi, and 3G, 4G or LTE radio services technology, each of which may use a different form of unique device identifiers.

For example, in cellular telephony systems, there are several unique identifiers in use, such as the International Mobile Subscriber Identity (IMSI), the International Mobile Equipment Identity (IMEI), and the Globally Unique Temporary ID (GUTI). The IMSI is a unique number used as the primary identifier of a subscriber and included in all signaling and messaging by the subscriber in Global System for Mobile Communications (GSM) and Universal Mobile Telecommunications System (UMTS) networks. Each IMSI number has a format of MCC+MNC+MSIN with two parts, where MCC is a Mobile Country Code, MNC is a Mobile Network Code and MSIN is a sequential serial number. The first part MCC+MNC includes six digits in a North American standard and five digits in a European standard to identify the subscriber network operator and specific country (e.g., a MCC of 310 for USA and a MNC of 410 for AT&T). The second part MSIN is allocated by the network operator to uniquely identify the subscriber. The IMEI is a unique number given to every mobile phone (typically found behind the battery) and stored in a database EIR (Equipment Identity Register) during a connection to a GSM network. The GUTI is used in LTE and identifies the mobile device to the LTE network.

In Wi-Fi systems (similar to Ethernet, or wired systems), the primary unique identifier associated with the network signal interface is a Media Access Control (MAC) address. A MAC address is a six-byte hexadecimal number with each byte written as two hexadecimal digits resulting in twelve hexadecimal digits. Each hexadecimal digit is a number from 0-9 or a letter from A-F (uppercase or lowercase), with digit pairs separated by colons, e.g., in a form similar to 01:23:45:67:89:AB.

Hence, it can be seen that embodiments in conformance with the foregoing discussion offer numerous advantages. For example, allocation of resources may be symmetric across all test instruments, and the user need not maintain separate test configurations for different test instruments. This makes such system and/or method easily scalable, e.g., even with heterogeneous configurations of 2-port and 8-port testers. Further, since a desired configuration setting may be done along with other DUT-specific configurations before initiation of testing, no specific handling is needed by the test application. After entry to the test system, the DUTs will be using system resources deterministically without needing to later be individually reassigned to other resources. This all results in eliminating need for a test application flow for such use cases, and reduced test setup time. Also, such method works when test resources are intended to be used across different testers. For example, for DUTs capable of operating with multiple RATs, such method allows distribution of the DUTs when there are cells broadcasting via different RATs simultaneously.

Further, the hosting tester may have different instruments with different capabilities for performing various types of tests. When configuring eligibility for a DUT to access or connect to PoA, it is desirable to be able to ensure that correct and adequate test resources are allocated to each DUT so as to enable performance of the desired tests. It can be seen that embodiments in conformance with the foregoing discussion advantageously enable a user (e.g., of the tester) to replace and/or modify available test instruments and/or resources to accommodate changes in desired tests to be performed, as well as changes in capabilities or performance of the DUT by updating the eligibility database file(s). The eligibility database file(s) may also be duplicated or distributed as desired for local and/or remote access by the various testers and points of access.

Various other modifications and alternatives in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for controlling uses of respective tester points of access during wireless testing of one or more radio frequency (RF) signal transceiver devices under test (DUTs), comprising:
   receiving, in a shared tester via a first wireless point of access (PoA) of a plurality of PoAs, a request by a DUT for access, wherein said request includes a unique device identifier associated with said DUT;
   determining, based on said unique device identifier included in said request, an eligibility of said DUT for access via said first PoA;
   responsive to a determination of eligibility of said DUT for access via said first PoA, enabling access by said DUT via said first PoA;
   responsive to a determination of eligibility of said DUT for access via a second PoA of said plurality of PoAs, transmitting a redirection message for said DUT with an identifier for said second PoA;
   receiving, in said shared tester via said second PoA, another request by said DUT for access via said second PoA, wherein said another request includes said unique device identifier; and
   enabling access by said DUT via said second PoA.

2. The method of claim 1, wherein said determining, based on said unique device identifier included in said request, an eligibility of said DUT for access via said first PoA comprises comparing said unique device identifier with one or more predetermined device identifiers.

3. The method of claim 2, wherein said comparing said unique device identifier with one or more predetermined device identifiers comprises comparing said unique device identifier with one or more programmable device identifiers.

4. The method of claim 2, wherein said comparing said unique device identifier with one or more predetermined device identifiers comprises comparing said unique device identifier with one or more predetermined device identifiers stored locally.

5. The method of claim 2, wherein said comparing said unique device identifier with one or more predetermined device identifiers comprises comparing said unique device identifier with one or more predetermined device identifiers stored remotely.

6. The method of claim 2, further comprising determining, based on said unique device identifier included in said another request, an eligibility of said DUT for access via said second PoA.

7. The method of claim 6, wherein said determining, based on said unique device identifier included in said another request, an eligibility of said DUT for access via said second PoA comprises comparing said unique device identifier with said one or more predetermined device identifiers.

8. The method of claim 7, wherein said comparing said unique device identifier with said one or more predetermined device identifiers comprises comparing said unique device identifier with one or more predetermined device identifiers stored locally.

9. The method of claim 7, wherein said comparing said unique device identifier with said one or more predetermined device identifiers comprises comparing said unique device identifier with one or more predetermined device identifiers stored remotely.

10. The method of claim 1, wherein: said receiving, via a first PoA of a plurality of PoAs, a request by a DUT for access comprises receiving said request via said first PoA in a first tester; and said receiving, via said second PoA, another request by said DUT for access to said second PoA comprises receiving said another request via said second PoA in a second tester.

11. The method of claim 1, wherein: said receiving, via a first PoA of a plurality of PoAs, a request by a DUT for access comprises receiving said request via said first PoA in a tester; and said determining, based on said unique device identifier included in said request, an eligibility of said DUT for access via said first PoA comprises comparing, with said tester, said unique device identifier with one or more predetermined device identifiers.

12. The method of claim 1, wherein said DUT comprises a cellular device and said plurality of PoAs comprises a plurality of cells.

13. The method of claim 1, wherein said DUT comprises a Wi-Fi device and said plurality of PoAs comprises a plurality of channels.

* * * * *